(12) United States Patent
Gillespie

(10) Patent No.: US 11,089,139 B2
(45) Date of Patent: Aug. 10, 2021

(54) METHOD OF AGGREGATING REPRESENTATIONAL STATE TRANSFER RESPONSE FIELDS

(71) Applicant: Bryan Gillespie, Germantown, MD (US)

(72) Inventor: Bryan Gillespie, Germantown, MD (US)

(73) Assignee: Hughes Network Systems, Germantown, MD (US)

( * ) Notice: Subject to any disclaimer, the term of this patent is extended or adjusted under 35 U.S.C. 154(b) by 0 days.

(21) Appl. No.: 16/411,028

(22) Filed: May 13, 2019

(65) Prior Publication Data

US 2020/0366765 A1 Nov. 19, 2020

(51) Int. Cl.
*H04L 29/06* (2006.01)
*H04B 7/185* (2006.01)
*H04L 29/08* (2006.01)

(52) U.S. Cl.
CPC ....... *H04L 69/161* (2013.01); *H04B 7/18586* (2013.01); *H04L 67/02* (2013.01)

(58) Field of Classification Search
CPC ..................................................... H04L 67/02
See application file for complete search history.

(56) References Cited

U.S. PATENT DOCUMENTS

| | | | | |
|---|---|---|---|---|
| 7,152,074 B2* | 12/2006 | Dettinger | ........... | G06F 16/258 707/810 |
| 7,694,287 B2* | 4/2010 | Singh | ........... | H04L 51/046 717/143 |
| 8,024,368 B2* | 9/2011 | Roy | ........... | G06F 40/143 707/802 |
| 8,458,200 B2* | 6/2013 | Dettinger | ........... | G06F 16/2423 707/754 |
| 8,745,096 B1* | 6/2014 | Noble | ........... | G06F 16/951 707/811 |
| 9,027,039 B2* | 5/2015 | Michels | ........... | G06F 9/54 719/328 |
| 9,146,962 B1* | 9/2015 | Boe | ........... | G06F 9/542 |
| 9,491,266 B2* | 11/2016 | Bohlmann | ........... | G06F 9/547 |
| 9,736,231 B1* | 8/2017 | Abrams | ........... | G06F 11/2023 |
| 9,910,640 B2* | 3/2018 | De Magalhaes | ........... | G06F 8/35 |
| 10,031,929 B2* | 7/2018 | Cohen | ........... | H04L 67/10 |
| 10,102,016 B2* | 10/2018 | Martori | ........... | G06F 21/6236 |
| 10,503,281 B2* | 12/2019 | Fujitsuka | ........... | G01L 1/148 |
| 2002/0078063 A1* | 6/2002 | Minder | ........... | G06F 16/284 |
| 2004/0019600 A1* | 1/2004 | Charlet | ........... | G06F 16/289 |
| 2010/0145946 A1* | 6/2010 | Conrad | ........... | G06F 16/2452 707/736 |
| 2013/0117749 A1* | 5/2013 | Mechelke | ........... | G06F 8/63 718/102 |

(Continued)

*Primary Examiner* — Lashonda T Jacobs
(74) *Attorney, Agent, or Firm* — Capitol City Techlaw; Jasbir Singh

(57) ABSTRACT

A system and method for aggregating representational state transfer (REST) API response fields, the method including receiving, via a satellite link, a schema including field definitions, where each of the field definitions includes an endpoint and a field. The method also includes retrieving, for each of the field definitions, the respective field from a result of invoking the respective endpoint; and aggregating a package including each retrieved field. The schema and the package may conform to a JavaScript Object Notation (JSON) schema format.

20 Claims, 2 Drawing Sheets

(56) References Cited

U.S. PATENT DOCUMENTS

| | | | |
|---|---|---|---|
| 2015/0373097 A1* | 12/2015 | Konkus | H04L 67/142 |
| | | | 709/203 |
| 2015/0378994 A1* | 12/2015 | Kaplinger | G06F 16/951 |
| | | | 707/722 |
| 2016/0077853 A1* | 3/2016 | Feng | G06F 9/54 |
| | | | 719/328 |
| 2018/0232262 A1* | 8/2018 | Chowdhury | G06F 16/252 |
| 2018/0365088 A1* | 12/2018 | Nakaike | G06F 9/547 |
| 2019/0196890 A1* | 6/2019 | Bucchi | G06F 16/24545 |
| 2019/0294610 A1* | 9/2019 | Naidu | G06F 16/2448 |
| 2019/0340287 A1* | 11/2019 | Tamjidi | G06F 9/547 |
| 2019/0370370 A1* | 12/2019 | Wittern | G06F 9/54 |
| 2020/0174861 A1* | 6/2020 | Christy Jesuraj | G06F 9/547 |
| 2020/0220949 A1* | 7/2020 | Puniani | H04L 67/02 |

* cited by examiner

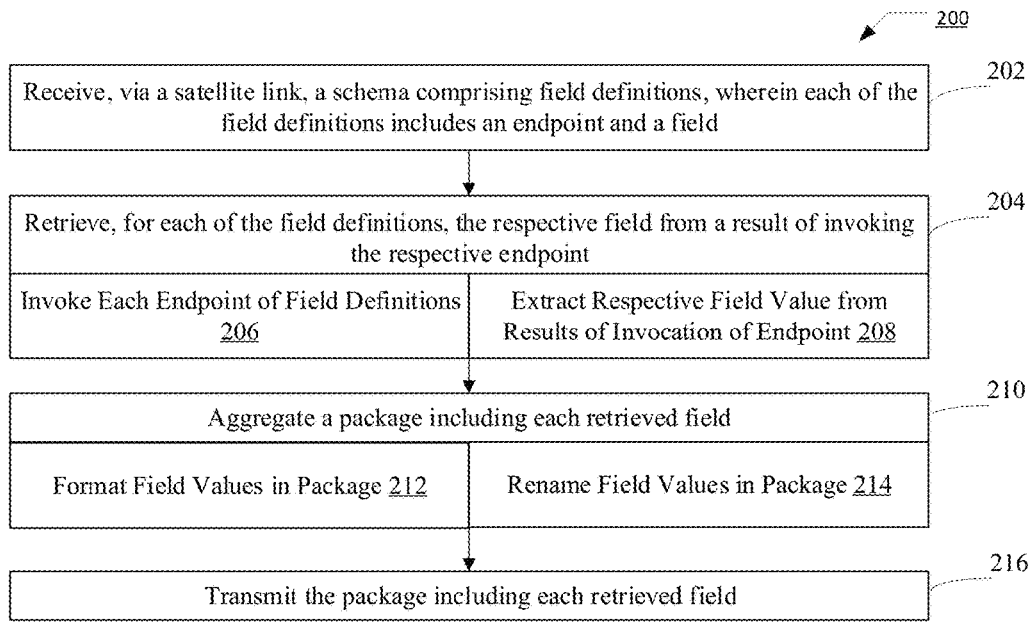
FIG. 2
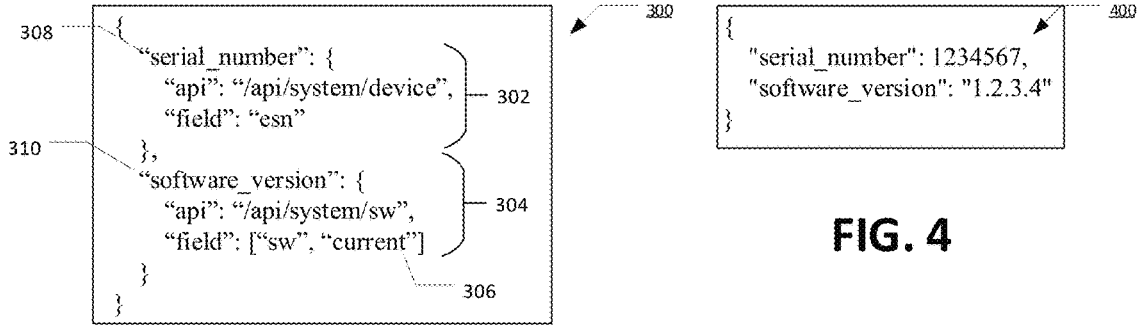
FIG. 3
FIG. 4
|  | Without Method | With Method | Reduction Factor |
| --- | --- | --- | --- |
| Average number of TCP connections per page | 7 | 1 | 7x |
| Average over-the-air total bytes downloaded (uncompressed) | 8100 | 300 | 27x |
FIG. 5

METHOD OF AGGREGATING REPRESENTATIONAL STATE TRANSFER RESPONSE FIELDS

FIELD

A system and method to utilize a schema language to allow a client to specify the shape and information it wants from multiple Representational State Transfer (REST) Application Programming Interface (API) endpoints. An aggregator, for example, on a server, may make multiple internal REST API requests, select the requested fields into a single response of the client's specification or forward it to a client. The present teachings may be provided as a layer on top of an existing REST API.

BACKGROUND

The REST API may be used with a Hypertext Transfer Protocol (HTTP) or Hypertext Transfer Protocol Secure (HTTPS), collectively HTTP, request. Traditionally, obtaining data from multiple REST API endpoints requires one HTTP request per endpoint to be made. The present teachings utilize existing REST APIs by adding a server-side aggregator layer that minimizes over-the-air TCP connections and data transfers. This is a problem for embedded satellite systems for a few reasons:

Each Hypertext Transfer Protocol or Hypertext Transfer Protocol Secure, collectively HTTP, request requires a separate TCP connection, which is a latency expensive operation over satellite link.

Each HTTP response likely contains wasteful, unneeded information that consumes bandwidth over the air, increasing download time.

Multiple terminals may have different software versions and hence different HTTP Application Programming Interface (API) endpoints.

Other prior art systems use a propriety query language and an API endpoint system that is not compatible with the existing REST APIs.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

With the present teachings, a webpage can make a single Hypertext Transfer Protocol or Hypertext Transfer Protocol Secure, collectively HTTP, request and get only the data needed for the webpage, reducing the number of TCP connections needed. In some embodiments, the number of TCP connections may be reduced to one. The reduction in number of TCP connections may save seconds of satellite TCP latency. Further, unneeded fields may be culled by the present teachings and data communications to obtain the results are reduced. The reduction in data communications minimizes a satellite link bandwidth usage. Moreover, a decreased payload or data communications size means less congestion and possibly faster over-the-air download time. In some embodiments, the response field names may exactly match what the client requested, regardless of the original REST API field names. As such, a client may shorten fields, leading to further bandwidth/download speed savings.

As such, a client may correct front-end compatibility issues at the request level. Furthermore, only the request schema needs to change to maintain compatibility between terminals with different software versions. The REST API can continue to function independently of this method, preserving backwards compatibility with existing applications The present teachings may be applied by over-the-air devices or dashboard applications utilizing HTTP APIs to display information from the over-the-air devices. For example, the present teachings provide an increase in the responsiveness of dashboard applications monitoring devices over a satellite link while simultaneously reducing the amount of bandwidth used.

The present teachings disclose a method for aggregating representational state transfer (REST) API response fields, the method including receiving, via a satellite link, a schema including field definitions, where each of the field definitions includes an endpoint and a field. The method also includes retrieving, for each of the field definitions, the respective field from a result of invoking the respective endpoint; and aggregating a package including each retrieved field. Other embodiments of this aspect include corresponding computer systems, apparatus, and computer programs recorded on one or more computer storage devices, each configured to perform the actions of the methods.

Implementations may include one or more of the following features. The method where at least one of the field definitions includes one or more fields, and the retrieving of each of the one or fields from a result of invoking the respective endpoint. The method where at least one of the field definitions includes an object or array nested field. The method where the receiving is performed by a web server and transmitting the package from the web server. The method where at least one of the field definitions includes an alias and the aggregating renames the respective field with the alias in the package. The method where the schema and the package conforms to a JavaScript Object Notation (JSON) schema format. The method where at least one of the field definitions includes a field format and the aggregating formats the respective field per the field format in the package. The method where the receiving, retrieving and aggregating are performed in a single transaction between a client and a server. Implementations of the described techniques may include hardware, a method or process, or computer software on a computer-accessible medium.

A system to aggregate Representational State Transfer (REST) API response fields, the system including: a request handler to receive, via a satellite link, a schema including field definitions, where each of the field definitions includes an endpoint and a field. The system also includes a schema parser to retrieve, for each of the field definitions, the respective field from a result of invoking the respective endpoint. The system may also include a package aggregator to aggregate a package including each retrieved field.

The system may include a field value extractor to extract each of the one or fields from a result of invoking the respective endpoint. The system may also include the request handler includes a web server and the system receives the schema with the web server and transmits the package from the web server. The system may also include a field value renamer to rename the respective field with alias in the package. The system may also include a field value formatter to format the respective field per the field format in the package. The system where the request handler receives the schema and transmits the package in a single transaction between a client and a server. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 2 illustrates a method for aggregating Representational State Transfer (REST) API response fields according to various embodiments.

FIG. 3 illustrates an exemplary schema format.

FIG. 4 illustrates an exemplary response.

FIG. 5 illustrates a reduction factor of a system to aggregate response fields into a single transaction.

Figure 1:
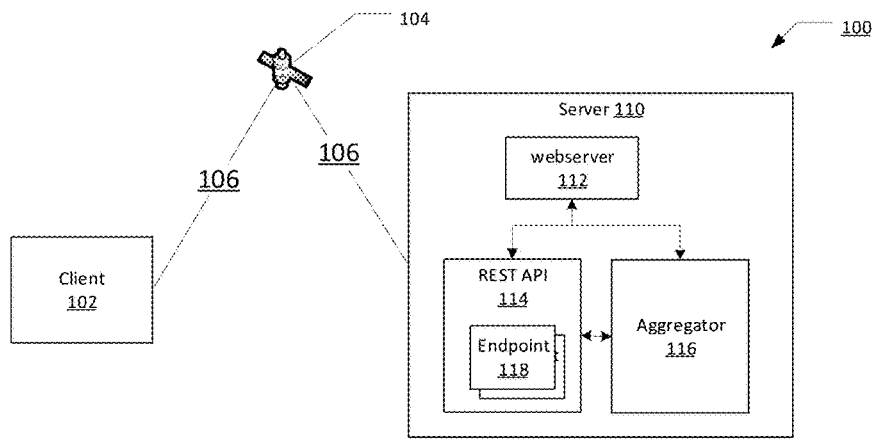
FIG. 1 illustrates an exemplary high-latency bandwidth network system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings are directed to aggregating Representational State Transfer (REST) API response fields for a high-latency network, such as, a high-latency network including a satellite link.

FIG. 1 illustrates an exemplary high-latency bandwidth network system.

A high-latency bandwidth network system 100 may include a client 102 connected via a satellite link 106 being relayed via a satellite 104 to a server 110. The server 110 may include a Web server 112 that services the client 102. The Web server 112 may connect to a REST API 114 and an aggregator 116. The client 102 may send a schema (see FIG. 3) to the Web server 112, for example, as a request (not shown) via HTTP to a REST API 114 connected to the Web server 112. Each of the Web Server 112, REST API 114 and the aggregator 116 may be hosted by one or more computers. One or more of the Web Server 112, REST API 114 and the aggregator 116 may be hosted by the same computer.

The request including the schema including field definitions may be received by the aggregator 116. For example, a client may send a POST request (not shown) to the aggregator 116 via the Web server 112. upon receiving the request, the aggregator 116 traverses the schema. The exemplary JSON schema 300 in FIG. 3 includes field definitions 302 and 304 for field "esn" and field "current" of a nested array "sw", respectively. The field definition 302 may have an alias 308, i.e., "serial_number", to which the field value is renamed in the response. Similarly, field definition 304 may have an alias 310, i.e., "software_version", to which the field value is renamed in the response.

The field definitions 302 and 304 may identify the server-side REST API call or endpoint 118 associated with the field. The aggregator 116 may access the endpoint 118 included in the REST API 114 to retrieve the fields (esn and sw.current) named in the field definitions 302 and 304 of the schema 300. In some embodiments, the aggregator 116 makes internal server-side requests to the REST API 114 and retrieves the requested fields from results of the internal server-side requests. For example, upon receiving exemplary schema 300 of FIG. 3, the aggregator 116 may make two internal calls to a respective endpoint 118, namely, /api/system/sw and /api/system/device to extract values for esn field and sw.current field.

In some embodiments, an object or array-nested field 306 may be retrieved from the REST API 114 in a result or response or therefrom. In some embodiments, a dotted and bracket notation (standard JavaScript notations) may be used to tell the aggregator 116 to retrieve the object or array-nested field. For example, in FIG. 3, field definition 304 requests the value of field "current" in the array-nested field "sw" 306.

Upon success, the aggregator 116 returns the retrieved values of the requested fields to the client 102. After the aggregator 116 has gleaned the desired data from the REST API 114, the aggregator 116 may package the desired data according to the way the client requested. In some embodiments, the aggregator 116 may rename the retrieved fields with aliases. For example, the "esn" and "sw.current" have been renamed as "serial_number" and "software_version," respectively in an exemplary package 400 of FIG. 4.

Figure 1A:
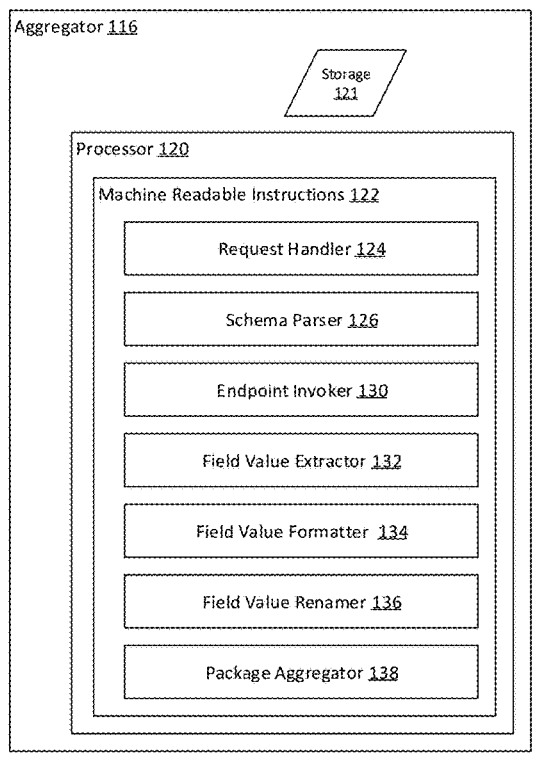
FIG. 1a is a block diagram illustrating an aggregator of response fields according to various embodiments.

FIG. 1a is a block diagram illustrating the aggregator 116 of response fields according to various embodiments. The aggregator 116 may be configured for a general-purpose computer including a processor 120 and an electronic storage 121. The processor 120 may execute machine-readable instructions 122 read from the electronic storage.

The machine-readable instructions 122 may include a request handler 124 to receive a schema per operation 202 and transmit a package per operation 216. The aggregator 116 may include a schema parser 126 to step through field definitions included in a schema to retrieve the fields defined therein per operation 204. The aggregator 116 may include an endpoint invoker 130 to invoke each endpoint of the field definitions for operation 206. The aggregator 116 may include a field value extractor 132 to extract respective field values from results of invocation of an endpoint for operation 208. The aggregator 116 may include a field value formatter 134 per operation 212. The aggregator 116 may include a field value renamer 136 per operation 214. The aggregator 116 may include a package aggregator 138 per operation 210.

FIG. 2 illustrates a method 200 for aggregating Representational State Transfer (REST) API response fields according to various embodiments.

A method 200 for aggregating REST API response fields may include an operation 202 to receive, via a satellite link, a schema comprising field definitions, wherein each of the field definitions includes an endpoint and a field. The method 200 may further include an operation 204 to retrieve, for each of the field definitions, the respective field from a result of invoking the respective endpoint. The method 200 may further include an operation 206 to invoke each endpoint of field definitions. The method 200 may further include an operation 208 to extract respective field value from results of invocation of endpoint. The method 200 may further include an operation 210 to aggregate a package including each retrieved field. The method 200 may further include an operation 212 to format field values in the package. The method 200 may further include an operation 214 to rename the field values in the package. The method 200 may further include an operation 216 to transmit the package including each retrieved field.

The present teachings significantly reduce over-the-air bandwidth and latency required to obtain data from a device connected via a satellite link. For example, FIG. 5 illustrates a summary dashboard 500 that requires at least 7 REST API calls communicating on average 8100 bytes over a satellite link are needed to render typical results using the prior art. In contrast, the summary dashboard notes that only 1 REST API call (to the aggregator 116) communicating on average 300 bytes over a satellite link are needed to render typical results using the present teachings as illustrated in FIG. 6. The reduction factor is 7× for the number of REST API calls and 27× for the number of bytes communicated over the satellite link. Requests that make more than 7 REST API calls will likely experience even greater reductions in total required TCP latency and download sizes.

In some embodiments, the internal server-side requests do not traverse a satellite link. In some embodiments, the internal server-side requests traverse a loopback network interface.

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

I claim:

1. A non-transient computer-readable storage medium having instructions embodied thereon, the instructions being executable by one or more processors to perform a method for aggregating Representational State Transfer (REST) Application Programming Interface (API) response fields, the method comprising:
   receiving, via a satellite link, a schema comprising field definitions, wherein each of the field definitions comprises a respective endpoint and a respective field;
   retrieving, for each of the field definitions, the respective field from a result of invoking the respective endpoint; and
   aggregating a package comprising each retrieved field.

2. The method of claim 1, wherein at least one of the field definitions comprises one or more fields, and the retrieving of each of the one or more fields from a result of invoking the respective endpoint.

3. The method of claim 1, wherein at least one of the field definitions comprises an object or array nested field.

4. The method of claim 1, wherein the receiving is performed by a Web server and the method further comprises transmitting the package from the Web server.

5. The method of claim 1, wherein at least one of the field definitions comprises an alias and the aggregating renames the respective field with the alias in the package.

6. The method of claim 1, wherein the schema and the package conforms to a JavaScript Object Notation (JSON) schema format.

7. The method of claim 1, wherein at least one of the field definitions comprises a field format and the aggregating formats the respective field per the field format in the package.

8. The method of claim 1 wherein the receiving, retrieving and aggregating are performed in a single transaction between a client and a server.

9. A system to aggregate Representational State Transfer (REST) Application Programming Interface (API) response fields, the system comprising:
   a request handler to receive, via a satellite link, a schema comprising field definitions, wherein each of the field definitions comprises a respective endpoint and a respective field;
   a schema parser to retrieve, for each of the field definitions, the respective field from a result of invoking the respective endpoint; and
   a package aggregator to aggregate a package comprising each retrieved field.

10. The system of claim 9, wherein at least one of the field definitions comprises one or more fields, and the system further comprises a field value extractor to extract each of the one or fields from a result of invoking the respective endpoint.

11. The system of claim 9, wherein at least one of the field definitions comprises an object or array nested field.

12. The system of claim 9, wherein the request handler comprises a Web server and the system receives the schema with the Web server and transmits the package from the Web server.

13. The system of claim 9, wherein at least one of the field definitions comprises an alias and the system further comprises a field value renamer to rename the respective field with the alias in the package.

14. The system of claim 9, wherein the schema and the package conform to a JavaScript Object Notation (JSON) schema format.

15. The system of claim 9, wherein at least one of the field definitions comprises a field format and the system further comprises a field value formatter to format the respective field per the field format in the package.

16. The system of claim 9, wherein the request handler receives the schema and transmits the package in a single transaction between a client and a server.

17. A non-transient computer-readable storage medium having instructions embodied thereon, the instructions being executable by one or more processors to perform a method for aggregating Representational State Transfer (REST) Application Programming Interface (API) response fields, the method comprising:
   receiving a schema comprising a plurality of field definitions, wherein each one of the plurality of field definitions comprises a respective endpoint and a respective field;
   retrieving, for each one of the plurality of field definitions, the respective field from a result of invoking the respective endpoint;
   aggregating a package comprising each retrieved field; and
   transmitting the package comprising each retrieved field, wherein the schema and the package conform to a JavaScript Object Notation (JSON) schema format, and wherein the retrieving of the plurality of field definitions is performed in a single transaction between a client and a server.

18. The method of claim 17, wherein at least one of the field definitions comprises an object or array nested field.

19. The method of claim 17, wherein the receiving is performed by a Web server and the method further comprises transmitting the package from the Web server.

20. The method of claim 17, wherein at least one of the field definitions comprises a field format and the aggregating formats the respective field per the field format in the package.

\* \* \* \* \*